United States Patent [19]

daCosta et al.

[11] 4,115,713

[45] Sep. 19, 1978

[54] ROTOR BIAS MEANS FOR MINIATURE WATCH MOTORS OR THE LIKE

[75] Inventors: Harry H. daCosta; Victor W. Foster, both of Scottsdale; Charles G. Thornton, deceased, late of Phoenix, Ariz., by Ella J. Thornton, heir

[73] Assignee: Motorola, Inc., Schaumburg, Ill.

[21] Appl. No.: 671,919

[22] Filed: Mar. 29, 1976

Related U.S. Application Data

[63] Continuation of Ser. No. 555,929, Mar. 6, 1975, abandoned.

[51] Int. Cl.² ............................................. H02K 37/00
[52] U.S. Cl. ........................... 310/49 R; 310/40 MM; 310/68 R; 310/90; 310/194
[58] Field of Search ................... 310/40, 40 MM, 156, 310/257, 258, 259, 218, 254, 41, 46, 99, 164, 193, 162, 163, 194, 49, 68, 90; 58/23, 23 A, 23 D

[56] References Cited

U.S. PATENT DOCUMENTS

| | | | |
|---|---|---|---|
| 3,486,098 | 12/1969 | Bullinger | 310/49 |
| 3,495,113 | 2/1970 | Haydon | 310/164 |
| 3,652,884 | 3/1972 | Vuffray | 58/23 D |
| 3,747,320 | 7/1973 | Vuffray | 58/23 D |
| 3,803,430 | 4/1974 | daCosta | 58/23 D |

FOREIGN PATENT DOCUMENTS 5,837/68   12/1970   Switzerland ............................. 310/156

Primary Examiner—R. S. Skudy
Attorney, Agent, or Firm—Michael D. Bingham

[57] ABSTRACT

A miniature electric motor is disclosed wherein a synthetic bobbin or frame has a rotor inside of a central cylindrical cavity, the rotor being supported in bearings which include large diameter flanges bonded to the bobbin. The windings are disposed around the bearing flanges and in grooves whose bottom surfaces are tangential to the cylindrical cavity. The windings thus assist in holding the bearing flanges to the bobbin and form part of the motor framework. The angular bottom surfaces effect increase in the number of turns in the windings and effects an increase in the rotor diameter and thus in the motor torque.

A ring yoke of high permeability and low remanence surrounds and is bonded to the bobbin. Attached to the inside wall of the yoke are two diametrically opposed soft iron pins located at an angle to the normal of axis of the field created by the windings to create poles for stopping the rotor at a predetermined position.

2 Claims, 6 Drawing Figures

ROTOR BIAS MEANS FOR MINIATURE WATCH MOTORS OR THE LIKE

BACKGROUND OF THE INVENTION

This application is a continuation of application Ser. No. 555,929, filed Mar. 6, 1975, now abandoned, and is related to application Ser. No. 304,885, filed Nov. 8, 1972 now U.S. Pat. No. 3,803,430, issued Apr. 9, 1974 in the name of the same inventors as here, for Miniature Motor For A Watch Or The Like, and assigned to the same assignee.

This invention relates to pulse operated miniature electric motors, more particularly to such miniature motors having good starting torque and low power consumption for watch movements and means for stopping the rotor at a desired point and it is an object of the invention to provide improved miniature motors of this nature.

Electric motors for watch movements by their very nature are small devices, usually being of the order of a few millimeters in overall dimensions. Miniature watch motors are known to the art and most, if not all, of them present some problems of ease of assembly, disassembly, efficiency, and torque.

This application provides efficient and simple solutions for these problems and presents a motor which is an integral unit separate from the watch requiring nc assembly into the watch movement and no need for wiring. Simply stated, the motor can be plugged into the printed circuit or other operating components of the watch without any separate electrical connections. The motor is positively located in the watch movement and provisions are made for several different methods of securing or mounting it in place.

Accordingly it is a further object of the invention to provide an improved pulse operated miniature electric motor of the nature indicated which is simple to manufacture, easy to assemble into a watch movement, provides positive starting, and stopping of the movement at the same point in each cycle.

It is a further object of the invention to provide a motor of the nature indicated that is inexpensive to make and efficient in operation.

Further objects and advantages will become apparent as the description proceeds.

SUMMARY OF THE INVENTION

In carrying out the invention in one form there is provided in a miniature motor for a timepiece including: a nonmagnetic stator having a central cylindrical cavity of a predetermined diameter and a predetermined longitudinal dimension; two nonmagnetic, relatively rigid disk closures attached at their peripheries to said stator for closing said cylindrical cavity to define a chamber and for rigidifying the assembly of said disks and stator; shaft bearings disposed centrally of said disk closures; a shaft disposed in said bearings; a permanent magnet member having a north and a south pole mounted on said shaft interiorly of said chamber; longitudinal and transverse slot means in said stator exteriorly of said cavity and said disk closures, the transverse dimension of said slot means increases as said transverse dimension approaches the diameter of said cavity; winding means disposed in said slot means for providing a magnetic field of a predetermined direction; and a ring yoke of high permeability and low remanence surrounding and attached to said stator in a mechanical stress free manner; means for creating a magnetic bias for stopping the rotor at a predetermined position comprising: pole means attached to the inside wall of said ring yoke.

In carrying out the invention according to a further form, the pole means comprises two soft iron pins diametrically opposed, attached to the inside wall of the ring yoke and located at an angle to the normal of the direction of said field to provide bias means for stopping the motor in the same position after each energization of said winding means and for reducing the starting torque following the application of a starting energization.

DESCRIPTION OF THE PREFERRED EMBODIMENTS

Figure 1:
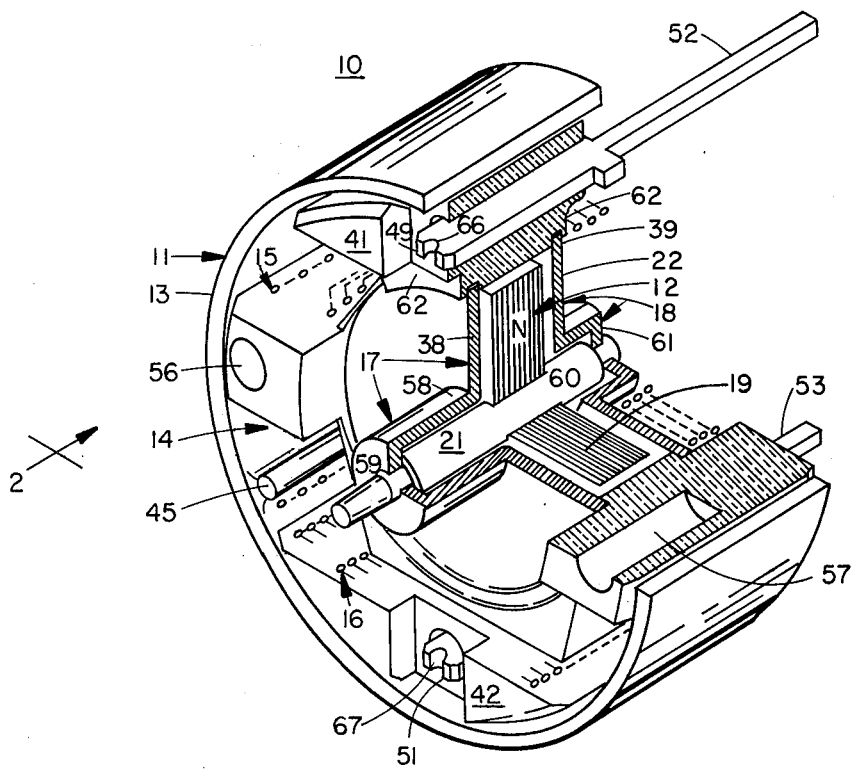
FIG. 1 is a perspective view on an enlarged scale somewhat fragmentary and with a section cut away of a motor according to the invention.

Referring to the drawings the invention is shown as comprising a motor 10 including a stator 11 and a rotor member 12. The status comprises a ring yoke 13, a winding bobbin or motor frame 14, winding coils 15 and 16 and bearing members 17 and 18. The rotor member 12 comprises a rotor 19 which may be in the form of a disk and a shaft 21 attached to the center of the rotor 19 as by some adhesive, for example an epoxy. The rotating member 19 may be formed of any well known high permeability, high magnetic strength magnetic alloys such for example as samarium cobalt and is magnetized such that north and south magnetic poles exist on opposite ends of a particular diameter. In some instances it may be convenient to use an ordinary bar magnet as compared with a disk member.

Figure 4:
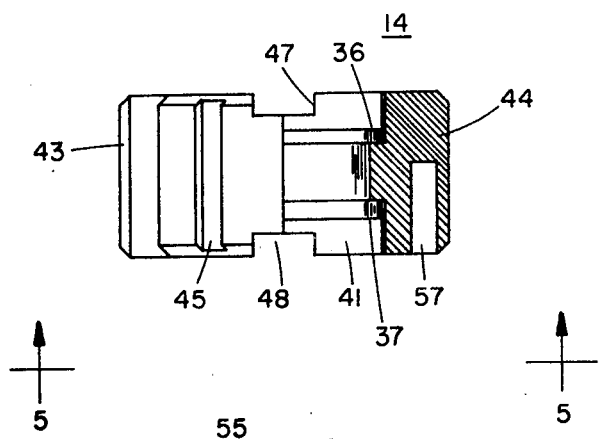
FIG. 4 is a plan view with a cut out portion of one component of the invention.
Figure 5:
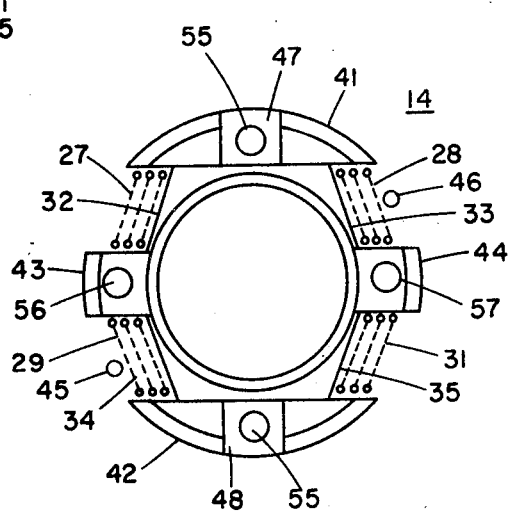
FIG. 5 is an elevational view taken substantially in the direction of arrows 5—5 of FIG. 1.
Figure 6:
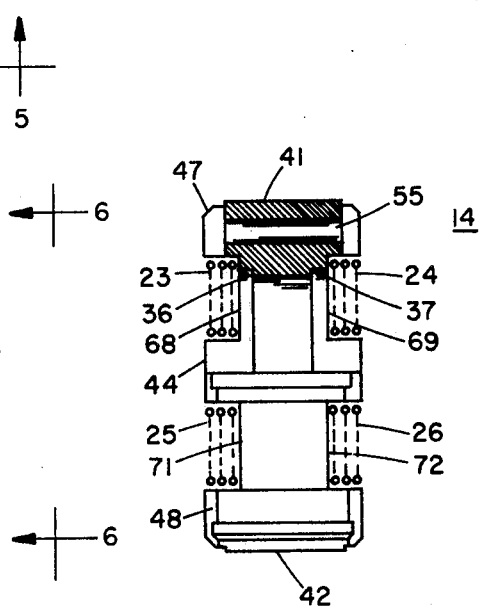
FIG. 6 is a side view with a section broken out taken substantially in the direction of arrows 6—6 of FIG. 5.

The motor frame member or bobbin 14, also shown in FIGS. 4, 5, and 6 comprises a one piece molded construction according to a preferred form of the invention. The material may be nylon, polyvinylchloride or any other synthetic material having sufficient dimensional stability and rigidity for the intended purposes. The material must be nonmagnetic and in appropriate instances may also be formed of brass or aluminum, for example, although these metals would have to be annodized to produce an insulating surface so as to not risk short circuiting the windings which are ultimately disposed on the bobbin.

The bobbin 14 is essentially a cylindrical piece having a central cylindrical cavity 22 therein within which the rotor 19 is ultimately received, there being sufficient clearance between the wells of the cavity 22 and the surfaces of the rotor 19 for this purpose. On one side of the center of the bobbin 14 transverse grooves 23 and 24 (FIG. 6) are formed and correspondingly on the other side of the center of the bobbin transverse grooves 25 and 26 are formed. Also on one side of the center of the bobbin, longitudinal grooves 27 and 28 are formed and on the other side of the bobbin, longitudinal grooves 29 and 31 are formed. The grooves 23,24 and 27,28 form one winding slot into which the winding 15 is wound or disposed, and the grooves 25,26 and 29,31 form another winding slot into which the winding 16 is wound or disposed.

The inner surfaces or bottoms 68,69 and 71,72 of the grooves 23,24, and 25, and 26, respectively, are parallel to each other as may be seen best in FIG. 6 but the interior surfaces or bottoms of the grooves 27 and 28, as shown for example, by lines 32 and 33 respectively in FIG. 5 are at an angle to each other and are in effect tangent to the cylindrical surface of the cavity 22. The angular disposition of the bottoms 27 and 28 enables more turns of wire to be disposed in the winding groove as compared with a winding groove wherein the bottoms 27 and 28 were parallel to each other. This may be observed in FIG. 2 by noting the darker cross hatched portion 20 as compared with lighter cross hatched portion 30.

In addition, the angular bottoms 27 and 28 enable the winding disposed in the grooves to be closer to the cylindrical wall of cavity 22 and thus closer to the surface of the magnetic rotor 19 which will be disposed therein. A more efficient magnetic circuit is thereby achieved. The motor is enabled to develop a higher torque level or more power output for the same power input. Similarly the grooves 29 and 31 have angularly disposed bottom surfaces as shown by the lines 34 and 35, respectively, and the winding groove formed by the slots 25,26 and 29,31 will receive more turns for the same stated reasons. The angular bottom surfaces 27,28 34, and 35 enable about 20% more turns to be disposed in the winding grooves as compared with ordinary constructions.

The end of the cylindrical cavity 22 terminates in circular grooves 36 and 37 which are adapted to receive, respectively, the flanges 38 and 39 of the bearing members 17 and 18, as will be more particularly described.

The formation of the winding grooves 23,24 and 27,28 and 25,26 and 29,31 leaves two segment-shaped portions 41 and 42 and two radial boss-like members 43 and 44. Radial grooves 47 and 48 are formed, as shown, in the segment portions 41 and 42 to receive the ends 49 and 51 of connecting pins 52 and 53. The enlarged ends 49 and 51 of the connecting pins 52 and 53 are press fitted into holes 54 and 55 in the segment members 41 and 42 respectively. Holes 56 and 57 are formed, respectively, in the boss-like members 43 and 44 for receiving screws in the event that such be desired.

The bearing member 17 includes a sleeve portion 58 and a large diameter radially extending flange 38 at right angles thereto at one end. At the other end a smaller flange 59 exists which includes the actual bearing surface centrally thereof for receiving one end of the shaft 21. Similarly the bearing member 18 includes a large diameter radially extending flange 39 projecting at right angles to a sleeve portion 60. At the other end a second and smaller diameter flange 61 exists at the inner central area of which there is the actual bearing surface for holding the other end of shaft 21. By having the bearing flanges 59 and 61 placed at the ends of the sleeve portions 58 and 60 the bearing surfaces for the shaft 21 are disposed far apart so that the shaft 21 is supported in a very stable and accurate manner. The bearing members 17 and 18 may be formed of any suitably hard nonmagnetic and dimensionally stable material. One type of such material which has been found to be satisfactory is the alloy beryllium copper. The bearing flanges 59 and 61 made of beryllium copper may run without lubrication as is well understood although lubrication of course may be provided.

In the assembling process the rotor 19 may be first assembled to the shaft 21. Thereafter the rotor and shaft are disposed in the cavity 22 of the bobbin or frame 14. This is followed by disposing the flanges 59 and 61 of the bearing members 17 and 18 over the appropriate ends of the shaft 21 and the outer peripheries of the large diameter flanges 38 and 39 in the respective grooves 36 and 37 at the ends of the cavity 22. While in this position beads 62 of synthetic material which may be of the same nature as that of the bobbin itself are formed over the outer peripheries of the flange members 38 and 39 as by the application of a heated tool. Beads 62 are formed in association with the surfaces of the grooves formed inwardly of the segment-shaped members 41 and 42 as may be seen best in FIG. 1. The flange members 38 and 39 are thus firmly bonded to the bobbin 14 and form therewith a relatively rigid structure which accurately and firmly holds the shaft 21 in the proper position.

Figure 2:
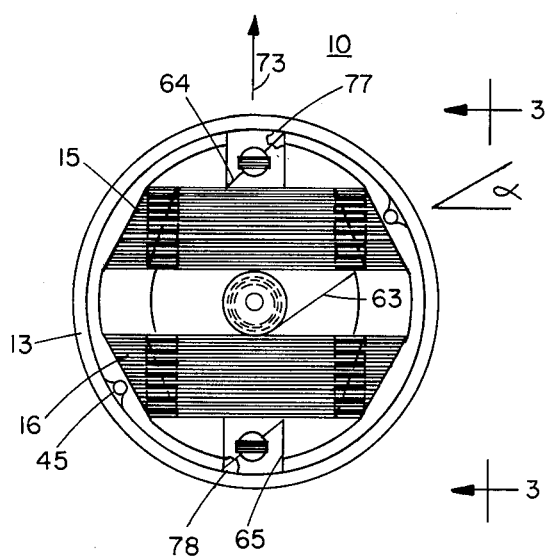
FIG. 2 is an elevational view on a different scale taken substantially in the direction of the arrows 2—2 of FIG. 1.

After the bobbin 14, the rotor 19 and shaft 21 together with the bearing members 17 and 18 have been assembled together, the windings 15 and 16 are wound in the appropriate grooves. The windings, or coils, 15 and 16 are wound in the grooves described along the angular surfaces 32, 33, 34, and 35 under ordinary tension for wire of the size as used here which for example may be No. 55 ASW. One hundred fifty-six feet in total comprising about 2200 turns in each of coils 15 and 16 are wound as described and the resistance of the windings may be about 5.6K ohms. The winding tension results in the inner surface of the cylindrical cavity 22 firmly engaging the outer edges of the bearing flanges 38 and 39 thereby forming a relatively rigid and in effect a monolithic structure. The windings being disposed on the outside of the bearing flanges 38 and 39 thus provides a significant portion of the strength of the unit. Referring to FIG. 2 it will be seen that the coils 15 and 16 are connected by a run 63 of wire and the ends 64 and 65 of the coils are disposed across and in the grooves 66 and 67 in the ends 49 and 51 of the connecting pins 52 and 53.

The grooves 36 and 37 (FIG. 6) terminating the end of the cylindrical cavity 22 are disposed inwardly of the surfaces 68 and 69, 71 and 72, which form the inward surfaces of the grooves receiving the windings. Accordingly, it will be evident that the innermost layer of the windings 15 and 16 are disposed slightly away from the surfaces of the bearing flanges 38 and 39 thereby avoiding the possibility of short circuits.

Surrounding the assembly of the rotor, bobbin, and windings is the ring yoke 13. The ring yoke is in the form of a shell or annulus having a longitudinal, or axial, dimension equal to or slightly greater than the longitudinal dimension of the bobbin 14. Attached to the inside wall of the ring yoke are two diametrically opposed soft iron pins 45 and 46 located at an angle $\alpha$ to the normal of the axis of the field created by the windings to create poles, or bias, for stopping the rotor at a predetermined position. The pins 45 and 46 may be attached to the ring yoke 13 by any suitable means such as welding, epoxy bonding, or otherwise.

The inner diameter of the ring 13 is just slightly larger than the diameter of the bobbin 14 so that the ring may be received thereover in very close fitting relationship.

The ring yoke is positioned as already described and secured by application of a flexible adhesive so that no mechanical stress or distortion is produced.

During operation, positive and negative pulses in succession are applied to the windings 15 and 16 and provide a magnetic field in the direction of the arrow 73 in FIG. 2. The application of each voltage pulse causes the rotor to step, rotate so to speak, 180° thereby coming opposite the poles, that is, at an angle α to the normal to the field direction, arrow 73. The rotor becomes stationary at this point. The application of the next pulse again causes the rotor to step one-half of a revolution, and again it comes to rest at the poles. The angle α may be of the order of thirty degrees, thereby assuring that the rotor will always start in the same direction.

The positions of pins 45 and 46 on the ring yoke removes them sufficiently away from the rotor 12 so that the starting torque, after the rotor has come to rest, is not excessive. Battery power is thus conserved.

The ring yoke 13 should be of any high permeability low remanence material.

Because the inner surfaces 32, 33, 34, and 35 of the winding grooves are at an angle, the rotor 19 may be approximately 20% larger in diameter than is possible in constructions where the coil shape is parallel sided and of comparable diameter. Higher torque level, or more power output, for the same electrical input is achieved.

The recesses 36 and 37 illustrated in FIGS. 1 and 6 provide mounting space for the wide flange bearings 38 and 39, allowing for extremely accurate alignment and positive centering of the rotor shaft to the motor frame. The bearing flanges also serve the purpose of entirely enclosing the rotating parts and preventing the wire winding from protruding into the rotor cavity. Also, being a close fit in their respective seats they impart a rigidity to the motor frame impossible to achieve with the molded plastic bobbin itself, thus preventing distortion due to the pressure of the many turns of tension wire wound on it.

Figure 3:
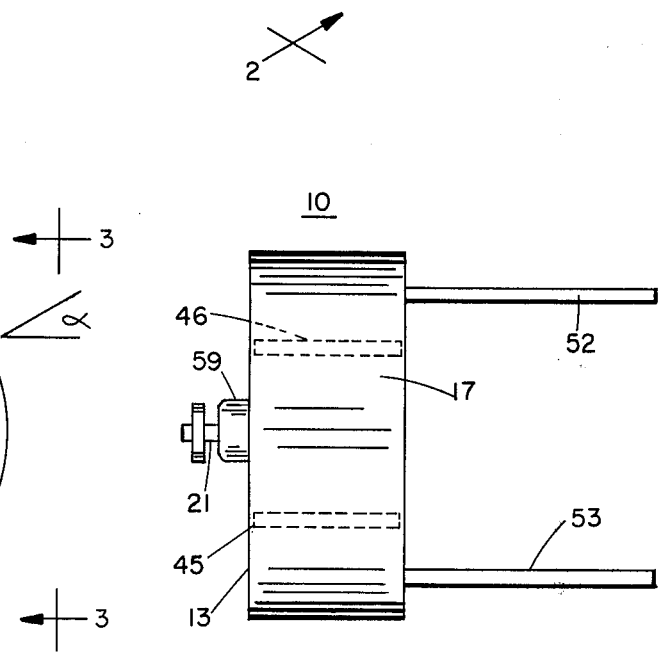
FIG. 3 is an elevational view taken substantially in the direction of the arrows 3—3 of FIG. 2.

The method of locking the two bearing flanges in place by hot pressing a bead of plastic or synthetic material over them provides a rigid mounting and positive end play positioning without any possibility of coming loose or loosening alignment. The bearings and frame become, in effect, one solid piece. The bearing surfaces themselves are an integral part of the whole bearing assembly and are spaced as far apart as possible for positive alignment and reduction of radial movement at the pinion end. Each bearing, as may be seen, is both radial and thrust, thereby eliminating the need for additional thrust bearings. The bearing 59 extends beyond the plane of the base of the motor as may be seen in FIG. 3, and its outside diameter is held to very tight concentricity and size tolerances. This provides a boss by which the motor can be accurately located in the watch movement by simply inserting the boss into a properly located hole in the watch movement.

The ends of the windings 64 and 65 are disposed across the grooves 66 and 67 in the end lugs 49 and 51 of the connecting pins 52 and 53 and soldered thereto. During assembly the ends of the wires 64 and 65 may be held as shown with a dab of cement 77 and 78 until the actual soldering operation is performed whereafter the blob of cement and the attached wire end are removed.

What is claimed is:

1. A miniature stepping motor including a nonmagnetic stator having a cylindrical cavity of predetermined dimensions, a ring yoke of high permeability and low remanance contiguously surrounding the stator, windings for producing, in response to applied current drive pulses, a magnetic field of a predetermined direction, a rotor which includes a permanent magnet member having north and south poles which is mounted on a shaft and is responsive to the magnetic field produced by the windings to be caused to step in 180° increments, comprising in combination:

the stator being a bobbin having longitudinal and traverse slots formed therein for receiving the windings and being of unibody construction;

bearing members attached at their peripheries to said stator interiorally of the windings for closing the cylindrical cavity, said bearing members including a sleeve portion, a first radially extending flange member attached to said sleeve portion at one end thereof and a second radially extending flange member attached to the other end of said sleeve portion, said second flange member supporting the ends of the shaft of the rotor; and bias means for stopping the rotor of the motor in a preferential direction with respect to the magnetic field produced by the windings when energized, said bias means including at least one soft iron pin attached to the inside wall of the ring yoke externally to the windings and spaced from but extending in the same direction and along the length of the axis of the shaft of the rotor, said at least one soft iron pin establishing an uniform magnetic bias for stopping the rotor as either one of the north or the south poles thereof become aligned opposite of said at least one soft iron pin so that said rotor is stopped after being rotated 180°.

2. The miniature stepping motor of claim 1 wherein said bias means includes two soft iron pins diametrically opposed with respect to each other.

* * * * *